US009945242B2

(12) United States Patent
Tura et al.

(10) Patent No.: US 9,945,242 B2
(45) Date of Patent: Apr. 17, 2018

(54) SYSTEM FOR THERMALLY ISOLATING A TURBINE SHROUD

(71) Applicant: General Electric Company, Schenectady, NY (US)

(72) Inventors: Christopher Paul Tura, Nahant, MA (US); Dylan James Fitzpatrick, Peabody, MA (US)

(73) Assignee: General Electric Company, Schenectady, NY (US)

( * ) Notice: Subject to any disclaimer, the term of this patent is extended or adjusted under 35 U.S.C. 154(b) by 326 days.

(21) Appl. No.: 14/708,336

(22) Filed: May 11, 2015

(65) Prior Publication Data
US 2016/0333713 A1 Nov. 17, 2016

(51) Int. Cl.
*F01D 11/08* (2006.01)
*F01D 9/04* (2006.01)
(Continued)

(52) U.S. Cl.
CPC ............ *F01D 11/08* (2013.01); *C04B 41/009* (2013.01); *C04B 41/52* (2013.01); *C04B 41/89* (2013.01);
(Continued)

(58) Field of Classification Search
CPC .......... F01D 11/00; F01D 11/08; F01D 11/12; F01D 11/122; F01D 11/125; F01D 11/18;
(Continued)

(56) References Cited

U.S. PATENT DOCUMENTS 3,843,279 A * 10/1974 Crossley ................. F01D 9/042
415/138
4,087,199 A * 5/1978 Hemsworth ............ F01D 11/08
415/173.3
(Continued)

FOREIGN PATENT DOCUMENTS

CN 1811135 A 8/2006
EP 0253994 A2 1/1988
(Continued)

OTHER PUBLICATIONS

European Search Report and Opinion issued in connection with corresponding EP Application 016168869.2 dated Sep. 22, 2016.
(Continued)

*Primary Examiner* — Lorne Meade
*Assistant Examiner* — Eric Linderman
(74) *Attorney, Agent, or Firm* — General Electric Company; William Scott Andes (57) ABSTRACT

In one aspect the present subject matter is directed to a system for thermally isolating a turbine shroud of a turbine shroud assembly. The system includes a shroud support having an inner surface and a turbine shroud that is connected to the shroud support. The turbine shroud includes a hot side surface that is radially spaced from a back side surface. At least a portion of the back side surface is oriented towards the inner surface of the shroud support. The system further includes a coating that is disposed along the back side surface of the turbine shroud. The coating regulates heat transfer from the turbine shroud to the shroud support or other hardware that may surround or be adjacent to the turbine shroud.

20 Claims, 3 Drawing Sheets

(51) Int. Cl.
  *F01D 25/08* (2006.01)
  *F01D 25/00* (2006.01)
  *F02C 3/04* (2006.01)
  *C04B 41/89* (2006.01)
  *C04B 41/00* (2006.01)
  *C04B 41/52* (2006.01)

(52) U.S. Cl.
  CPC ............ *F01D 9/04* (2013.01); *F01D 25/005* (2013.01); *F01D 25/08* (2013.01); *F02C 3/04* (2013.01); *F05D 2220/32* (2013.01); *F05D 2230/31* (2013.01); *F05D 2230/90* (2013.01); *F05D 2240/11* (2013.01); *F05D 2240/55* (2013.01); *F05D 2260/231* (2013.01); *F05D 2300/15* (2013.01); *F05D 2300/21* (2013.01); *F05D 2300/228* (2013.01); *F05D 2300/502* (2013.01); *F05D 2300/5024* (2013.01); *F05D 2300/514* (2013.01); *F05D 2300/6033* (2013.01); *F05D 2300/611* (2013.01); *Y02T 50/672* (2013.01)

(58) Field of Classification Search
  CPC .................. F01D 25/08; F01D 25/145; F05D 2300/6033; F05D 2300/611; F05D 2300/55; F05D 2300/11
  See application file for complete search history.

(56) References Cited

U.S. PATENT DOCUMENTS

| | | | |
|---|---|---|---|
| 4,411,594 A | 10/1983 | Pellow et al. | |
| 4,722,188 A * | 2/1988 | Otters | F02G 1/0435 60/517 |
| 5,295,787 A * | 3/1994 | Leonard | F01D 11/18 415/134 |
| 5,380,154 A * | 1/1995 | Norton | F01D 9/023 415/200 |
| 5,459,995 A * | 10/1995 | Norton | F01D 25/246 60/753 |
| 5,487,642 A * | 1/1996 | Norton | F01D 25/246 415/209.2 |
| 5,503,528 A * | 4/1996 | Glezer | F01D 11/001 415/115 |
| 5,797,723 A * | 8/1998 | Frost | F01D 11/005 415/174.2 |
| 6,203,847 B1 * | 3/2001 | Conner | C23C 10/02 29/889.1 |
| 6,238,180 B1 * | 5/2001 | Magoshi | F01D 11/00 415/168.4 |
| 6,659,472 B2 * | 12/2003 | Aksit | F01D 11/003 277/647 |
| 6,733,235 B2 * | 5/2004 | Alford | F01D 11/08 415/173.1 |
| 6,767,659 B1 * | 7/2004 | Campbell | C04B 41/009 428/697 |
| 6,814,538 B2 * | 11/2004 | Thompson | F01D 11/08 29/889.1 |
| 6,932,566 B2 * | 8/2005 | Suzumura | F01D 11/08 415/135 |
| 7,479,328 B2 | 1/2009 | Roth-Fagaraseanu et al. | |
| 7,722,317 B2 | 5/2010 | Schiavo et al. | |
| 7,771,160 B2 | 8/2010 | Shi et al. | |
| 8,684,680 B2 | 4/2014 | Martin et al. | |
| 2002/0102360 A1 * | 8/2002 | Subramanian | C23C 24/04 427/419.1 |
| 2003/0133790 A1 * | 7/2003 | Darkins, Jr. | F01D 9/04 415/139 |
| 2004/0005216 A1 * | 1/2004 | Suzumura | F01D 11/08 415/173.3 |
| 2004/0011245 A1 * | 1/2004 | Sambasivan | C23C 4/134 106/14.12 |
| 2004/0047726 A1 * | 3/2004 | Morrison | F01D 9/04 415/116 |
| 2004/0258946 A1 * | 12/2004 | Allen | C23C 28/321 428/622 |
| 2005/0084665 A1 * | 4/2005 | DiChiara, Jr. | B28B 19/0053 428/293.4 |
| 2005/0141989 A1 * | 6/2005 | Sayegh | F01D 9/04 415/116 |
| 2006/0029814 A1 | 2/2006 | Bhatia et al. | |
| 2008/0087021 A1 * | 4/2008 | Radonovich | F01D 11/122 60/752 |
| 2010/0015401 A1 * | 1/2010 | Bolz | C23C 14/083 428/172 |
| 2010/0104426 A1 * | 4/2010 | Keller | F01D 11/12 415/173.1 |
| 2010/0104433 A1 | 4/2010 | Shi et al. | |
| 2010/0247298 A1 * | 9/2010 | Nakamura | F01D 11/18 415/173.1 |
| 2011/0189009 A1 * | 8/2011 | Shapiro | F01D 25/246 415/209.3 |
| 2011/0293410 A1 * | 12/2011 | Marusko | F01D 9/04 415/173.1 |
| 2011/0318171 A1 * | 12/2011 | Albers | F01D 11/125 415/173.1 |
| 2012/0082540 A1 * | 4/2012 | Dziech | F01D 11/005 415/173.1 |
| 2013/0094946 A1 | 4/2013 | Shi et al. | |
| 2014/0023490 A1 * | 1/2014 | Hillier | F01D 11/005 415/173.6 |
| 2014/0202168 A1 * | 7/2014 | Shapiro | F01D 9/04 60/796 |
| 2015/0003958 A1 * | 1/2015 | Uskert | F01D 11/24 415/1 |
| 2015/0192025 A1 * | 7/2015 | Boeck | F01D 9/04 415/173.7 |
| 2015/0377069 A1 * | 12/2015 | Landwehr | F01D 25/28 415/1 |
| 2016/0047549 A1 * | 2/2016 | Landwehr | F23R 3/007 60/753 |
| 2016/0209033 A1 * | 7/2016 | Burd | F23R 3/002 |
| 2016/0265367 A1 * | 9/2016 | Rosenzweig | C04B 41/89 |
| 2016/0298467 A1 * | 10/2016 | Ucasz | C23C 14/083 |
| 2016/0312639 A1 * | 10/2016 | Shapiro | F01D 9/04 |
| 2016/0376921 A1 * | 12/2016 | O'Leary | F01D 25/12 415/116 |
| 2017/0044920 A1 * | 2/2017 | Vetters | F01D 25/246 |

FOREIGN PATENT DOCUMENTS

| | | |
|---|---|---|
| EP | 1362983 A2 | 11/2003 |
| EP | 2505786 A2 | 10/2012 |
| JP | 2002-504641 A | 2/2002 |
| JP | 2012107592 A | 6/2012 |
| JP | 2012-140937 A | 7/2012 |
| JP | 2013-134052 A | 7/2013 |
| WO | 2014143364 A2 | 9/2014 |
| WO | 2014164859 A2 | 10/2014 |

OTHER PUBLICATIONS

First Office Action and Search issued in connection with corresponding CN Application No. 201610308306.2 dated Apr. 5, 2017.
Search Report issued in connection with corresponding JP Application No. 2016-092924 dated Apr. 14, 2017.

* cited by examiner

SYSTEM FOR THERMALLY ISOLATING A TURBINE SHROUD

FIELD OF THE INVENTION

The present subject matter relates generally to a turbine shroud assembly for a gas turbine engine. More particularly, the present subject matter relates to a turbine shroud of the turbine shroud assembly having at least one coating for thermally isolating the turbine shroud from adjacent metallic hardware components.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor disks and turbine rotor blades, and various stationary turbine components such as stator vanes or nozzles, turbine shrouds, shroud supports and engine frames. The rotatable and the stationary turbine components at least partially define the hot gas path through the turbine section.

As the combustion gases flow through the hot gas path, thermal energy is transferred from the combustion gases to the rotatable turbine components and the stationary turbine components. As a result, it is generally necessary to cool the various rotatable and stationary turbine components to meet thermal and/or mechanical performance requirements. Conventionally, a cooling medium such as compressed air is routed from the compressor section through various cooling passages or circuits defined within or around the various rotatable and stationary turbine components, thus providing cooling to those components. Use of ceramic matrix composite shrouds in the HPT allows for less backside cooling of the turbine shrouds via the compressed air due to the favorable thermal properties of the ceramic matrix composite material. As a result, the amount of compressed air normally routed into or around the shroud assembly is reduced, thus enhancing overall engine performance and/or efficiency.

The reduction in cooling flow to the shroud assembly may result in higher temperatures on stationary hardware such as the shroud support hardware of the shroud assembly that surrounds or is adjacent to the shroud. For example, thermal energy absorbed by the ceramic matrix composite turbine shrouds may radiate and/or be conducted from side and back side surfaces of the turbine shroud to the stationary hardware that surrounds, is adjacent to or in contact with the turbine shrouds. Accordingly, a turbine shroud having at least a portion of a backside surface coated with a coating for thermally isolating the turbine shroud from adjacent metallic components such as mounting hardware would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for thermally isolating a turbine shroud of a turbine shroud assembly. The system includes a shroud support having an inner surface and a turbine shroud that is connected to the shroud support. The turbine shroud includes a hot side surface that is radially spaced from a back side surface. At least a portion of the back side surface is oriented towards the inner surface of the shroud support. The system further includes a coating that is disposed along the back side surface of the turbine. The coating regulates heat transfer from the back side surface of the turbine shroud to the shroud support.

Another aspect of the present subject matter is directed to a gas turbine engine. The gas turbine engine includes a compressor, a combustion section, a turbine section having a turbine shroud assembly that circumscribes a row of turbine rotor blades and a system for thermally isolating a turbine shroud of a turbine shroud assembly. The system includes a shroud support having an inner surface and a turbine shroud that is connected to the shroud support. The turbine shroud is formed from a ceramic matrix composite material and includes a hot side surface that is radially spaced from a back side surface. At least a portion of the back side surface is oriented towards the inner surface of the shroud support. The system further incudes a coating that is disposed on the back side surface of the turbine shroud. The coating regulates heat transfer from the back side surface of the turbine shroud to the shroud support.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Figure 1:
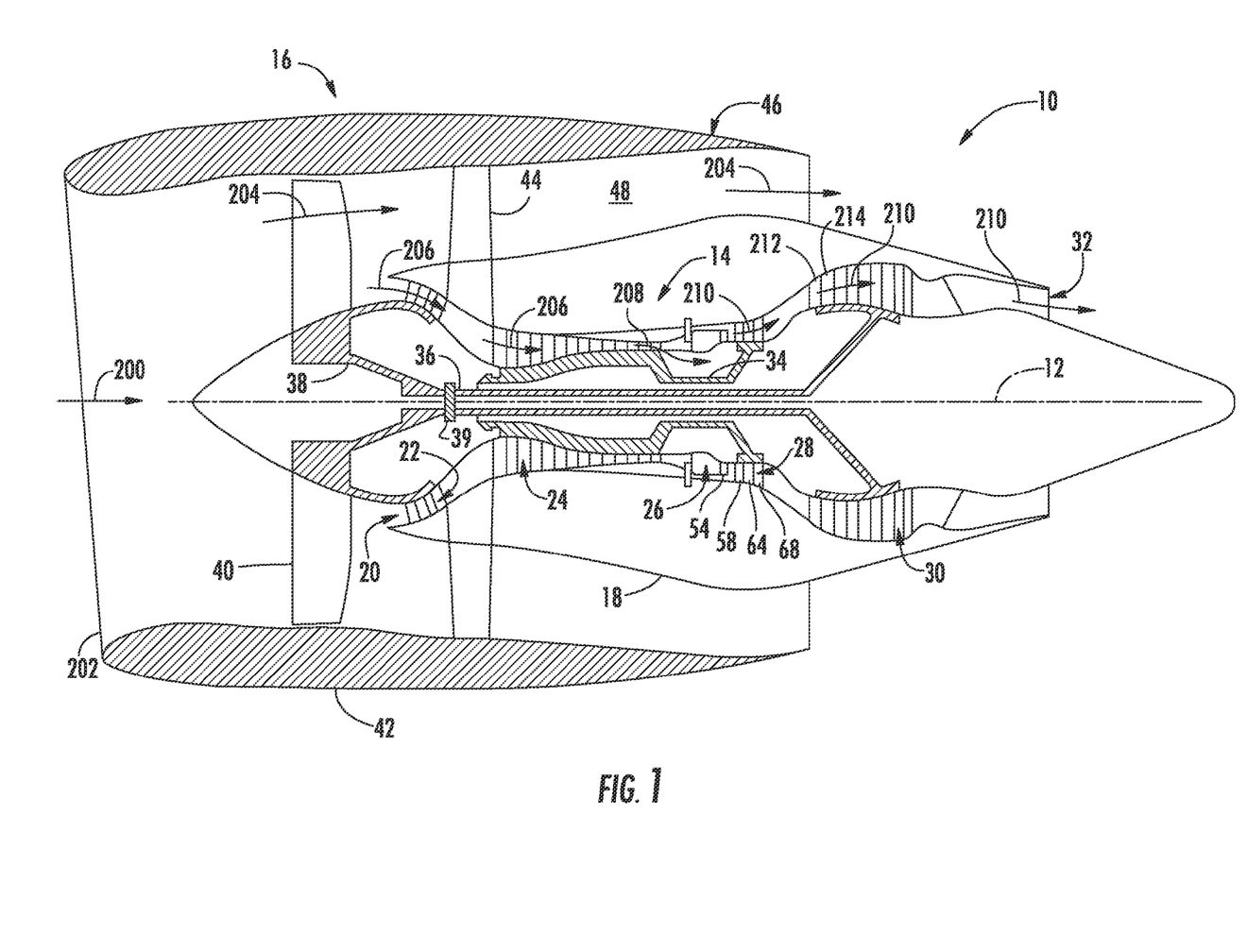
FIG. 1 is a schematic cross-sectional view of an exemplary high bypass turbofan jet engine as may incorporate various embodiments of the present invention.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a core turbine or gas turbine engine 14 this disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, as shown in FIG. 1, the (LP) spool 36 may be connected directly to the fan spool 38 such as in a direct-drive configuration. In alternative configurations, the (LP) spool 36 may be connected to the fan spool 38 via a reduction gear 39 such as in an indirect-drive or geared-drive configuration.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 so as to define a bypass airflow passage 48 therebetween.

Figure 2:
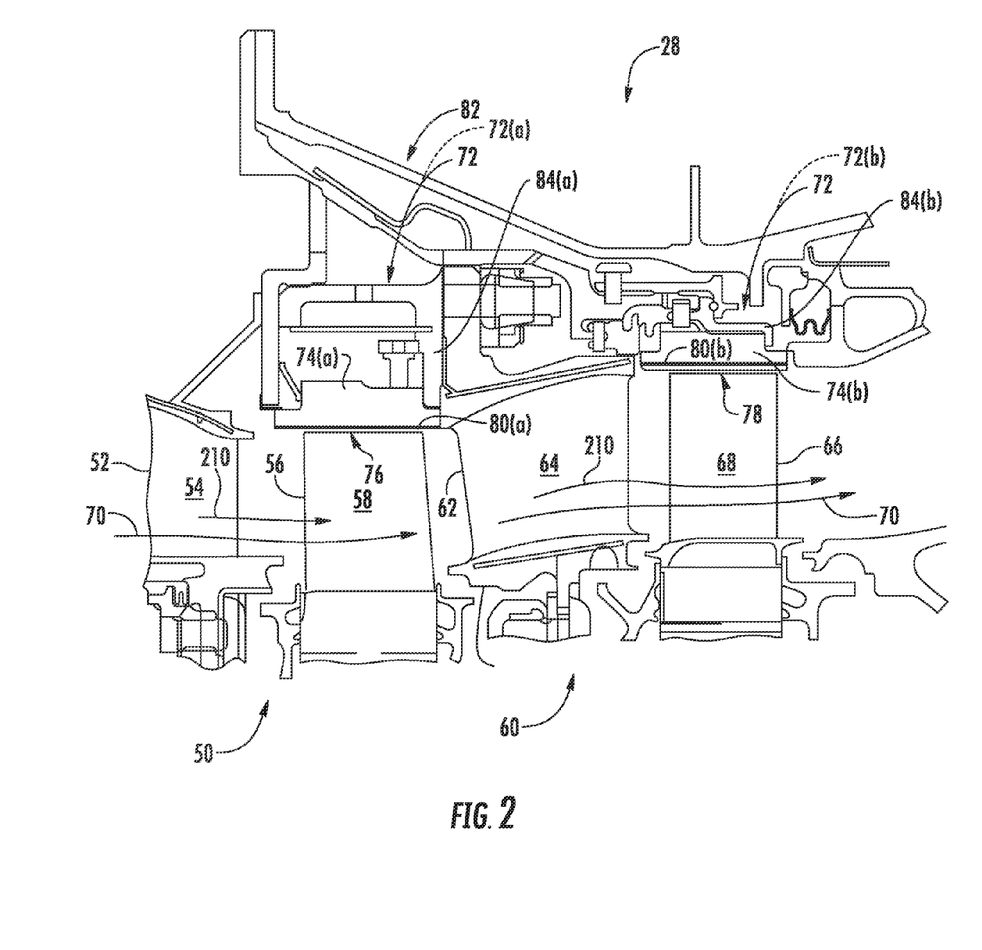
FIG. 2 is an enlarged cross sectional side view of a high pressure turbine portion of the gas turbine engine as shown in FIG. 1, as may incorporate various embodiments of the present invention.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes a row 52 of stator vanes 54 (only one shown) axially spaced from a row 56 of turbine rotor blades 58 (only one shown). The HP turbine 28 further includes a second stage 60 which includes a row 62 of stator vanes 64 (only one shown) axially spaced from a row 66 of turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

In various embodiments, as shown in FIG. 2, the HP turbine 28 includes at least one turbine shroud assembly 72. For example, as shown in FIG. 2, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68.

Each turbine shroud assembly 72(a), 72(b) includes a turbine shroud or shroud seal 74(a), 74(b). The turbine shrouds 74(a), 74(b) are radially spaced from blade tips 76, 78 of the turbine rotor blades 58, 68 to form clearance gaps between the blade tips 76, 78 and sealing surfaces or hot side surfaces 80(a), 80(b) of the corresponding turbine shrouds 74(a), 74(b). It is generally desirable to minimize the clearance gap between the blade tips 76, 78 and the turbine shrouds 74(a), 74(b), particularly during cruise operation of the turbofan 10 to reduce leakage from the hot gas path 70 over the blade tips 76, 78 and through the clearance gaps.

In particular embodiments, at least one of the turbine shrouds 74(a), 74(b) may be formed as a continuous, unitary or seamless ring made of a ceramic material and, more particularly, a ceramic matrix composite (CMC) material. Each turbine shroud assembly 72(a), 72(b) may be connected to a static structure such as a backbone or casing 82 of the gas turbine engine 14 via corresponding shroud rings or other static or stationary hardware components 84(a), 84(b).

During operation of the turbofan 10, as illustrated in FIG. 1, air 200 enters an inlet portion 202 of the turbofan 10. A first portion of the air 200 as indicated by arrow 204 is directed into the bypass flow passage 48 and a second portion of the air 200 as indicated by arrow 206 enters the inlet 20 of the LP compressor 22. The second portion of air 206 is progressively compressed as it is routed from the LP compressor 22 into the HP compressor 24. The second portion of the air 206 is further compressed as it is routed through the HP compressor 24, thus providing compressed air as indicated by arrow 208 to the combustion section 26 where it is mixed with fuel and burned to provide combustion gases as indicated by arrow 210.

The combustion gases 210 are routed through the HP turbine 28 where a portion of kinetic and/or thermal energy from the combustion gases 210 is extracted via the stator vanes 54, 64 and turbine rotor blades 58, 68 of the first and second stages 50, 60 respectively, thus causing the HP shaft or spool 34 to rotate, thereby supporting operation of the HP compressor 24. The combustion gases 210 are then routed through the LP turbine 30 where a second portion of thermal and kinetic energy is extracted from the combustion gases 210 via sequential stages of LP turbine stator vanes 212 and LP turbine rotor blades 214 that are coupled to the LP shaft or spool 36, thus causing the LP shaft or spool 36 to rotate, thereby supporting operation of the LP compressor 22 and/or rotation of the fan spool or shaft 38. The combustion gases 210 are then routed through the jet exhaust nozzle section 32 of the gas turbine engine 14.

Along with a turbofan engine 10, a core turbine 14 serves a similar purpose and sees a similar environment in land based gas turbine, a turbojet engine, where the ratio of the first portion of air 204 to the second portion of air 206 is less than that of a turbo fan, and in an unducted fan engine, where the fan section 16 is devoid of a nacelle 42. In each of the turbofan, turbojet, and unducted engines, a speed reduction device, for example, a reduction gearbox 39, may be included between any shafts and spools, for example, between the (LP) shaft or spool 36 and the fan spool or shaft 38 of the fan section 16.

The temperature of the combustion gases 210 flowing through the HP and LP turbine sections 28, 30, particularly through the HP turbine 28, may be extreme. For example, the combustion gases 210 flowing through the hot gas path 70 defined by/within the HP turbine 28 may exceed 2000 degrees Fahrenheit. As a result, it is generally necessary and/or beneficial to cool the various turbine hardware components of the HP turbine 28 and/or the LP turbine 30 such as but not limited to the turbine shroud assemblies 72(*a*), 72(*b*) via cooling air routed from the compressor 22, 24 to meet thermal and/or mechanical performance requirements.

Use of ceramic or ceramic matrix composite materials to form the turbine shrouds 74(*a*), 74(*b*) may reduce the amount of cooling air that is normally required to cool shroud seals made from non-ceramic or non-ceramic matrix composite materials. Although reduction in cooling flow to cool the turbine shrouds 74(*a*), 74 (*b*) may enhance overall engine efficiency, the reduction in cooling air flow may have undesirable effects on portions of the turbine shroud assemblies 72(*a*), 72(*b*) that may be formed from other materials such as metal alloys or other composite materials that have less favorable thermal properties for use at such elevated temperatures when compared to the ceramic or ceramic matrix composite material from which the turbine shrouds 74(*a*), 74(*b*) may be formed.

For example, thermal energy absorbed by the ceramic or the ceramic matrix composite material of the turbine shrouds 74(*a*), 74(*b*) along the hot side 80(*a*), 80(*b*) may radiate from various back side surfaces of the turbine shrouds 74(*a*), 74(*b*) and be absorbed by adjacent stationary hardware. In addition or in the alternative, thermal energy absorbed by the ceramic or ceramic matrix composite material of the turbine shrouds 74(*a*), 74(*b*) may be conducted away from various surfaces of the turbine shrouds 74(*a*), 74(*b*) via conduction and/or radiation heat transfer and absorbed by various static components that are in contact with and/or immediately adjacent to the turbine shrouds 74(*a*), 74(*b*). As a result, the radiated or conducted thermal energy may negatively impact the mechanical function and/or life of the static or stationary hardware components.

Figure 3:
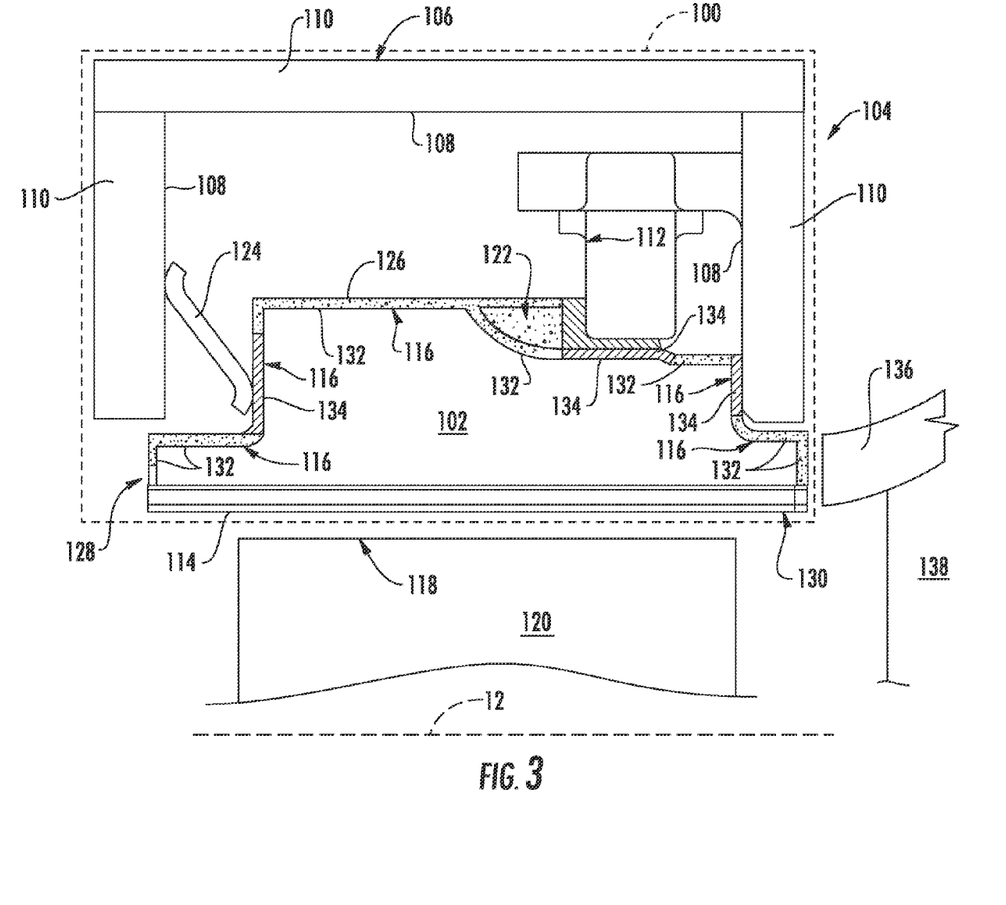
FIG. 3 is an enlarged side view of a portion of an exemplary turbine shroud assembly according to various embodiments of the present invention.

FIG. 3 is an enlarged side view of a system 100 for thermally isolating a turbine shroud 102 such as turbine shroud 74(*a*) and/or 74(*b*) of a turbine shroud assembly 104 such as but not limited to turbine shroud assembly 72(*a*) and/or 72(*b*) from adjacent stationary hardware components, according to various embodiments of the present invention. It is intended that the system 100 as shown and as described in FIG. 3, may be modified to be incorporated into the gas turbine engine 14 in place of either or both of the first or second turbine shroud assemblies 72(*a*), 72(*b*) as shown in FIG. 2, or positioned around any row of turbine rotor blades within the gas turbine engine 14.

In one embodiment, as shown in FIG. 3, the system 100 includes a shroud support 106 having various inner surfaces 108. The shroud support 106 may include one or more walls 110 that at least partially surround at least a portion of the turbine shroud 102. The walls 110 may at least partially define the inner surfaces 108 of the turbine shroud assembly 104. The turbine shroud 102 may be connected or coupled to at least one wall 110 of the one or more walls 110 via a retention member 112 such as a retaining pin.

The turbine shroud 102 includes a hot side surface 114 that is radially spaced with respect to centerline 12 from a back side surface 116 of the turbine shroud 102. In particular embodiments, the turbine shroud 102 is at least partially formed form a ceramic material. In particular embodiments, the turbine shroud 102 is formed from a ceramic matrix composite material. In various embodiments, the turbine shroud 102 may be formed as a continuous, unitary or seamless ring made of a ceramic material or a ceramic matrix composite material.

The hot side surface 114 is radially spaced from a blade tip 118 such as blade tips 76, 78 (FIG. 2) of a turbine rotor blade 120 such as turbine rotor blades 58, 68 (FIG. 2). In various embodiments, as shown in FIG. 3, portions of the back side surface 116 are generally oriented towards or face the inner surface 108 of the shroud support 106. Portions of the back side surface 116 may be substantially flat while other portions of the back side surface 116 may be curved, stepped and/or angled. In particular embodiments, a slot or channel 122 may be defined along the back side surface 116. The slot 122 may be formed to receive the retention member 112. In particular embodiments, a seal 124 may extend between a portion of the back side surface 116 and the inner wall 108 of the shroud support 106.

In various embodiments, the system 100 includes a coating 126. The coating 126 is disposed along at least a portion of the back side surface 116 of the turbine shroud 102. In particular embodiments, a portion of the coating 126 is disposed along at least one of a leading edge portion 128 or a trailing edge portion 130 of the turbine shroud 102. The coating 126 may include any coating that is capable of restricting or preventing heat transfer from the turbine shroud 102 to the surrounding shroud support 106 and/or the retention member 112 and/or other surrounding hardware. In other words, the coating 126 may comprise any coating which has a thermal emissivity value and/or a thermal conductivity value that is less than an emissivity value and/or a thermal conductivity value of the turbine shroud 102 as measured along the back side surface 116 and that is suitable for use on the turbine shroud 102 and that is suitable for prolonged use in the gas turbine engine 14 operating environment.

The coating 126 or portions of the coating 126 may be applied via any known and suitable method. For example but not by way of limitation, the coating 126 may be applied via spray gun, Electron Beam Physical Vapor Deposition (EBPVD), Air Plasma Spray (APS), High Velocity Oxygen Fuel (HVOF), Electrostatic Spray Assisted Vapor Deposition (ESAVD) or Direct Vapor Deposition (DVD). The coating 126 may be applied in substantially constant thicknesses across the back side surface 116 or in varying thicknesses and/or densities across the back side surface 116 of the turbine shroud 102.

The coating 126 may be a single layer or multi-layer coating. The coating 126 may comprise of a single coating material applied across at least a portion of the back side surface 116 of the turbine shroud 102 or may comprise of more than one coating material disposed along various portions or zones of the back side surface 116. For example, in particular embodiments, the coating 126 may comprise a first coating material 132 disposed along a portion of the back side surface 116 and a second coating material 134 disposed along a different portion of the back side surface 116.

The first coating material 132 may be applied or disposed on a portion or portions of the back side surface 116 that is/are oriented towards or face(s) the inner surface 108 of the shroud support 106. In particular embodiments, the first coating 132 may comprise a thermal paint. For example, the thermal paint may be or may have heat transfer properties, particularly thermal emissivity values that are the same or substantially the same as "CJKN13" which is a thermal paint that is commercially available from Thermal Paint Services, Inc., San Diego, Calif. In at least one embodiment, the thermal paint has a relatively low emissivity value as compared to a thermal emissivity value of the back side surface 116 of the turbine shroud 102 in an uncoated condition, thus restricting or inhibiting radiation heat transfer from the back side surface 116 to the surrounding mounting hardware.

In one embodiment where the turbine shroud 102 is formed from a ceramic matrix composite material, the turbine shroud 102 in an uncoated condition has an emissivity value of between about 0.7 and 0.85. In one embodiment, at least a portion of the coating 126 such as the first coating 132 has an emissivity value that is greater than 0.0 but less than 0.7. In one embodiment, at least a portion of the coating 126 has an emissivity value that is between about 0.3 and about 0.7.

The second coating material 134 may be applied or disposed on a portion or portions of the back side surface 116 that is/are in contact with and/or immediately adjacent to a portion of the inner surface 108, the retaining member 112, the seal 124 and/or other stationary hardware components such as an outer band portion 136 of an adjacent stationary vane 138. In one embodiment, at least a portion of the coating 126 such as the second coating 134 has a thermal conductivity value that is relatively low when compared to a thermal conductivity value of the turbine shroud 102.

In various embodiments, the coating 126 such as the second coating 134 may include or comprise an environmental barrier coating (EBC) and/or a thermal barrier coating (TBC) which has/have relatively low conductivity values or ratings when compared to a conductivity value or rating of the back side surface 116 of the turbine shroud 102. For example, in one embodiment, the coating 126 such as the second coating 134 may include or comprise a multi-layer or 5-layer EBC coating system such as is commercially available from Ellison Surface Technologies, Inc., Mason, Ohio. The EBC coating system may include an internal coating which serves as a bond coat (e.g., comprising silicon or silica) and an external coating. The external coating may comprise a plurality of layers formed from one or more rare earth silicates. For example, the external coating can include one or more of a mullite layer, a mullite-alkaline earth aluminosilicate mixture layer, an yttrium monosilicate (YMS) layer, an ytterbium doped yttrium disilicate (YbYDS) layer, a barium strontium aluminosilicate (BSAS) layer, etc.

In particular embodiments, one or more of the external coating layers of the EBC coating system may be engineered to be porous (less dense) rather than having a 100% density. The introduction of the engineered porosity has a direct effect on the thermal conductivity of the coating 126. More specifically, the engineered porosity may be used to restrict or regulate thermal conduction through the layers. The density of particular external coating layer(s) may be chosen for particular locations along the back side surface 116 based at least in part on one or more of a localized temperature along the back side surface 116, the thermal conductivity value of the seal 124, the thermal conductivity of the turbine shroud 102 or other components or hardware that are in contact with or immediately adjacent to the back side surface 116. The density of one or more of the external coating layers may be any density that is less than 100%. In particular embodiments, the density of one or more of the external coating layers may be at least 50% but less than 90%. In particular embodiments, the density of one or more of the external coating layers may be between about 65% and about 80%. In particular embodiments, the density of one or more of the external coating layers may be about 75%.

In one embodiment, a portion of the seal 124 engages with a portion of the coating 126 and a different portion of the seal 124 engages against the inner surface 108, thereby defining a conductive path for thermal energy to travel between the backside surface 116 and the inner surface 108. In this embodiment, the coating 126 or the second coating 134 restricts or regulates conductive heat transfer between the backside surface 116 and the portion of the seal 124 that is in contact therewith. In particular embodiments where a portion of the back side surface 116 is in contact with the inner surface 108 of the turbine shroud support 106 via a portion of the coating 126, the portion of the coating 126 that is in contact with the inner surface 108 restricts or regulates conductive heat transfer between the backside surface 116 and the inner surface 108.

In embodiments where the turbine shroud 102 is formed from ceramic matrix composite materials, the turbine shrouds 102 are capable of successful operation at temperatures that far exceed the thermal capability of adjacent metallic hardware. This static hardware faces challenges meeting mechanical functional requirements and cyclic life capability goals when exposed to elevated temperatures. Therefore, the application of the coatings 126, 132, 134 to thermally isolate the back side surface 116 of the turbine shroud 102 from the static hardware lowers the maximum temperatures realized by the adjacent metallic hardware structures and allows for successful system-level integration of ceramic matrix composite turbine shrouds into high pressure turbine architectures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for thermally isolating a turbine shroud of a turbine shroud assembly, the system comprising:
a shroud support having an inner surface;
the turbine shroud connected to the shroud support via a retaining pin, the turbine shroud having a hot side surface radially spaced from a back side surface, wherein the back side surface is oriented towards the inner surface of the shroud support, wherein at least a portion of the back side surface is curved; and
a coating disposed along the back side surface of the turbine shroud, wherein the coating regulates heat transfer via conduction or radiation from the back side surface of the turbine shroud to the shroud support, the coating further comprising;
a first coating material covering a first portion of the back side surface; and
a second coating material covering a second portion of the back side surface,
wherein the first coating material is a different coating material from the second coating material, and
wherein the curved back side surface portion receives the retaining pin.

2. The system as in claim 1, wherein the turbine shroud is formed from a ceramic matrix composite material,
wherein the first coating material covers a first radially outward facing portion of the back side surface, and
wherein the second coating material covers a second radially outward facing portion of the back side surface.

3. The system as in claim 1, wherein at least a portion of the coating has an emissivity value that is less than an emissivity value of the turbine shroud,
wherein the first coating material covers a first axially forward facing portion of the back side surface, and
wherein the second coating material covers a second axially forward facing portion of the back side surface.

4. The system as in claim 3, wherein the first coating material has an emissivity value of greater than 0 and less than 0.7.

5. The system as in claim 4, wherein the second coating material has an emissivity value of between 0.3 and 0.7.

6. The system as in claim 5, wherein at least a portion of the coating comprises a multi-layer environmental barrier coating, wherein at least one layer of the environmental barrier coating is porous, and
wherein the at least one layer of porous environmental barrier coating has a density between 50% and 90%.

7. The system as in claim 6, wherein the shroud support is formed from a metal alloy, and
wherein the at least one layer of porous environmental barrier coating has a density between 65% and 80%.

8. The system as in claim 1, wherein the turbine shroud is formed from a ceramic matrix composite material having an emissivity value of 0.8,
wherein the first coating material covers a first axially aft facing portion of the back side surface, and
wherein the second coating material covers a second axially aft facing portion of the back side surface.

9. The system as in claim 1, wherein the first coating material is disposed along a portion of the back side surface that is not immediately adjacent to or in contact with the inner surface of the turbine shroud support and the second coating material is disposed along a portion of the back side surface that is immediately adjacent or in contact with the inner surface of the turbine shroud support.

10. The system as in claim 1, further comprising a seal that engages with a portion of the coating and with the inner surface of the shroud support, wherein the portion of the coating engaged with the seal regulates conductive heat transfer from the back side surface of the turbine shroud to the seal.

11. The system as in claim 1, wherein a portion of the back side surface is in contact with the inner surface of the turbine shroud support via a portion of the coating, and
wherein the first coating material further comprises a thermal paint.

12. The system as in claim 1, wherein the turbine shroud further includes a leading edge portion and a trailing edge portion, wherein at least a portion of the coating is disposed along at least one of the leading edge portion or the trailing edge portion.

13. The system as in claim 12, wherein at least a portion of the coating has an emissivity value that is less than an emissivity value of the turbine shroud.

14. The system as in claim 13, wherein at least a portion of the coating has an emissivity value of greater than 0 and less than 0.7.

15. The system as in claim 12, wherein the turbine shroud is formed from a ceramic matrix composite material.

16. The system as in claim 15, wherein the ceramic matrix composite material has an emissivity value of between 0.6 and 0.8.

17. The system as in claim 12, wherein the first coating material is disposed along a portion of the back side surface that is not immediately adjacent to or in contact with the inner surface of the turbine shroud support and the second coating material is disposed along a portion of the back side surface that is immediately adjacent or in contact with the inner surface of the turbine shroud support.

18. The system as in claim 12, further comprising a seal that engages with a portion of the coating and with the inner surface of the shroud support, wherein the portion of the coating engaged with the seal regulates conductive heat transfer from the back side surface of the turbine shroud to the seal.

19. The system as in claim 12, wherein a portion of the back side surface is in contact with the inner surface of the turbine shroud support via a portion of the coating, wherein the portion of the coating engaged with the inner surface comprises a multi-layer environmental barrier coating, wherein at least one layer of the environmental barrier coating is porous, and
wherein the multi-layer environmental barrier coating is a 5-layer environmental barrier coating.

20. A gas turbine engine, comprising:
a compressor;
a combustion section;
a turbine section having a turbine shroud assembly that circumscribes a row of turbine rotor blades; and
a system for thermally isolating a turbine shroud of the turbine shroud assembly, the system comprising:
a shroud support having an inner surface;
the turbine shroud connected to the shroud support via a retaining pin, the turbine shroud being formed from a ceramic matrix composite material, the turbine shroud having a hot side surface radially spaced from a back side surface, wherein at least a portion of the back side surface is oriented towards the inner surface of the shroud support, wherein at least a portion of the back side surface is curved; and
a coating disposed on the back side surface of the turbine shroud, wherein the coating regulates heat transfer via conduction or radiation from the back side surface of the turbine shroud to the shroud support, the coating further comprising;

a first coating material covering a first portion of the back side surface; and a second coating material covering a second portion of the back side surface, wherein the first coating material is a different coating material from the second coating material, and wherein the curved back side surface portion receives the retaining pin.

* * * * *